(12) United States Patent
Banerjee et al.

(10) Patent No.: US 11,627,062 B2
(45) Date of Patent: *Apr. 11, 2023

(54) DESIGNATED INTERMEDIATE SYSTEM (DIS) PRIORITY CHANGING

(71) Applicant: Cisco Technology, Inc., San Jose, CA (US)

(72) Inventors: Ayan Banerjee, Fremont, CA (US); Dhananjaya Rao, Sunnyvale, CA (US); Sridhar Santhanam, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,176

(22) Filed: Jun. 1, 2022

(65) Prior Publication Data

US 2022/0303200 A1 Sep. 22, 2022

Related U.S. Application Data

(63) Continuation of application No. 17/203,333, filed on Mar. 16, 2021, now Pat. No. 11,381,485.

(51) Int. Cl.
*G06F 15/173* (2006.01)
*H04L 43/0817* (2022.01)
*H04L 43/0876* (2022.01)
*H04L 41/12* (2022.01)
*H04L 43/0811* (2022.01)
*H04L 43/0823* (2022.01)

(52) U.S. Cl.
CPC .......... *H04L 43/0817* (2013.01); *H04L 41/12* (2013.01); *H04L 43/0811* (2013.01); *H04L 43/0823* (2013.01); *H04L 43/0876* (2013.01)

(58) Field of Classification Search
CPC ............. H04L 43/0817; H04L 43/0811; H04L 43/0823; H04L 43/0876; H04L 41/12
See application file for complete search history.

(56) References Cited

U.S. PATENT DOCUMENTS

| 10,257,074 B1 | 4/2019 | Singh et al. |
| 2012/0213117 A1 | 8/2012 | Banerjee et al. |

(Continued)

FOREIGN PATENT DOCUMENTS

WO  WO2017036176 A1  3/2017

OTHER PUBLICATIONS

Cisco Systems, Inc. ("Introduction to Intermediate System-to-Intermediate System Protocol", 25 pages, 2002) (Year: 2002).

*Primary Examiner* — Alicia Baturay
*Assistant Examiner* — Joseph R Maniwang
(74) *Attorney, Agent, or Firm* — Lee & Hayes, P.C.

(57) ABSTRACT

A communication pathway between a plurality of network nodes within a network is established. A DIS election operation is executed to determine a first network node among the plurality of network nodes as the DIS for the network and creating a first pseudo node for the first network node, and with each network node of the plurality of network nodes, determining whether the connectivity between the first network node and the other network nodes of the plurality of network nodes within the network is in a synchronous state with the adjacencies with the other network nodes of the plurality of network nodes within the network.

20 Claims, 7 Drawing Sheets

(56) References Cited

U.S. PATENT DOCUMENTS

| | | | |
|---|---|---|---|
| 2014/0086043 A1* | 3/2014 | Banerjee | H04L 43/16 |
| | | | 370/221 |
| 2014/0317259 A1 | 10/2014 | Previdi et al. | |
| 2017/0005816 A1 | 1/2017 | Chang et al. | |
| 2019/0372898 A1 | 12/2019 | Mishra et al. | |

* cited by examiner

DESIGNATED INTERMEDIATE SYSTEM (DIS) PRIORITY CHANGING

RELATED APPLICATIONS

This application is a continuation of and claims priority to U.S. patent application Ser. No. 17/203,333, filed on Mar. 16, 2021, the disclosure of which is incorporated by reference herein.

TECHNICAL FIELD

The present disclosure relates generally to the field of communications, and more particularly, to systems and methods for intelligently maintaining connectivity in a network environment.

BACKGROUND

Computer networking serves to allow for the efficient transmission of data between network nodes within the network. In some instances, as data propagates in the network, the data may become inconsistent due to loss in connection between two or more network nodes within the network. This may result in disruptions in network traffic and/or may cause certain traffic flows to drop due to inaccurate routing information amongst network nodes. Hence, it may be a challenge to maintain accurate connectivity data in a network environment. In overlay technologies based on intermediate system to intermediate system (IS-IS) protocol, the IS-IS protocol does not have control plane redundancy. As a result, on certain underlay failures, the control plane may be partitioned resulting in data plane traffic loss.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
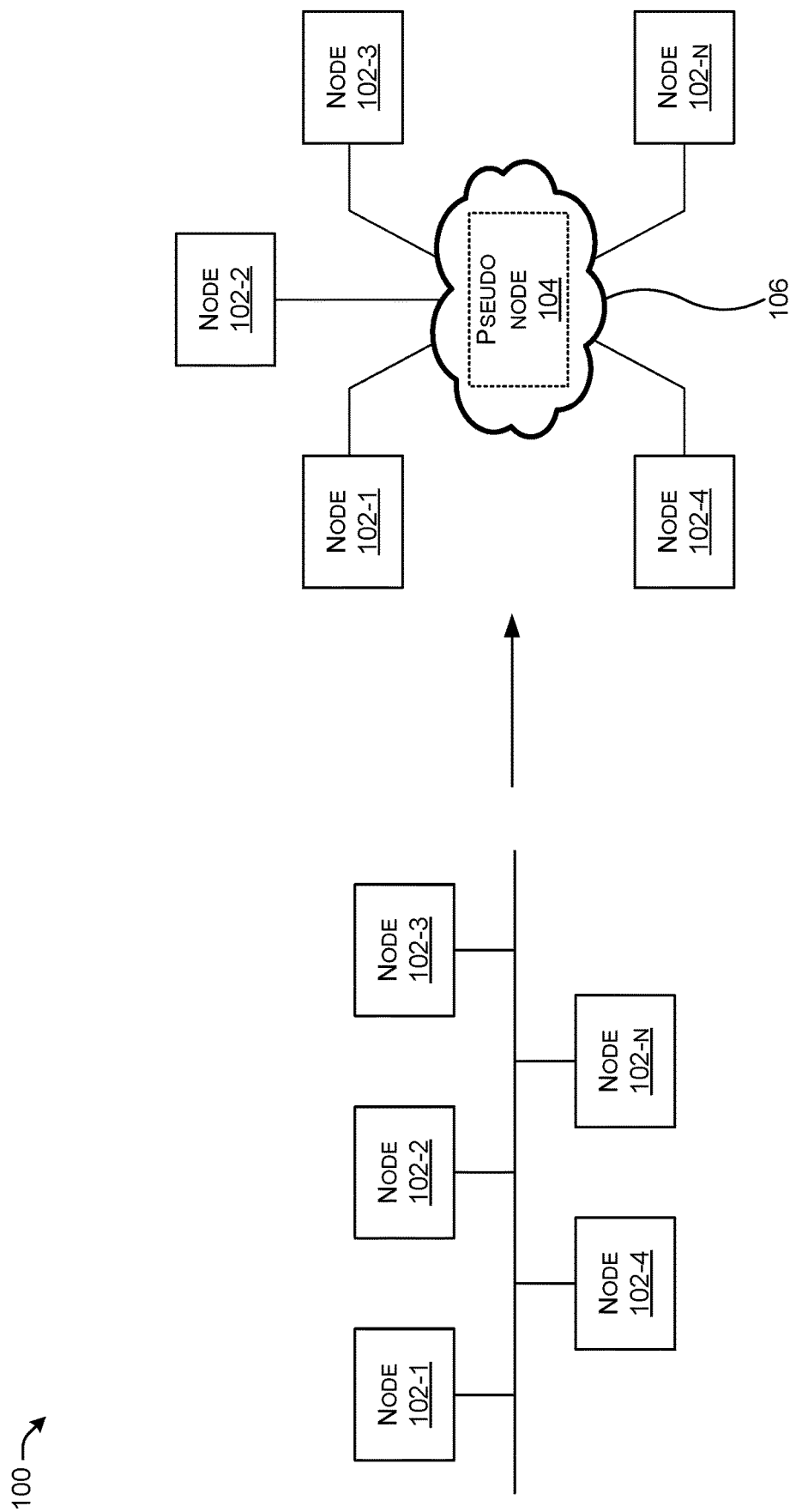
FIG. 1 illustrates a block diagram of a communication system for intelligently maintaining connectivity in a network environment, according to an example of the principles described herein.

As mentioned above, in some overlay network technologies, the control plane and the data plane, when separated, allows for control plane redundancy such as in the case of, for example, multiple border gateway protocol (BGP) route reflectors (RRs). However, because an intermediate system to intermediate system (IS-IS) protocol network does not include such constructs, an IS-IS-based network may attempt to mimic control plane redundancy as found in other overlay network technologies but in a different manner.

Overview

Examples described herein provide a method may include establishing a communication pathway between a plurality of network nodes within a network. The plurality of network nodes have adjacencies with one another. The method further includes executing a designated intermediate system (DIS) election operation to determine a first network node among the plurality of network nodes as the DIS for the network and creating a first pseudo node for the first network node. The first pseudo node includes a first pseudo node link state packet (PSN-LSP). The method may further include, with each network node of the plurality of network nodes, monitoring connectivity between the first network node and the other network nodes of the plurality of network nodes within the network, and monitoring adjacencies with the other network nodes of the plurality of network nodes within the network. The method may also include determining whether the connectivity between the first network node and the other network nodes of the plurality of network nodes within the network is in a synchronous state with the adjacencies with the other network nodes of the plurality of network nodes within the network.

The method may further include, based at least in part on a determination that the connectivity between the first network node and the other network nodes of the plurality of network nodes within the network is in a non-synchronous state with the adjacencies with the other network nodes of the plurality of network nodes within the network, monitoring the non-synchronous state for a first period of time. Based at least in part on a determination that the non-synchronous state exists after the first period of time, executing a DIS priority change algorithm to change the DIS from the first network node to a second network node, the second network node creating a second pseudo node including a second PSN-LSP.

Executing the DIS priority change algorithm may include identifying the second network node of the plurality of network nodes with a highest number of adjacencies, and assigning the second network node to be the DIS. The method may further include disqualifying the first network node and any other network node of the plurality of network nodes lacking connectivity with the first network node from being assigned as the DIS.

Assigning the second network node to be the DIS may include assigning the second network node with a relatively higher DIS priority field than any other network node of the plurality of network nodes. The method further includes, based at least in part on a determination that two of the plurality of network nodes have a highest number of adjacencies, identifying the second network node of the plurality of network nodes with a highest system identification, and assigning the second network node to be the DIS based on the highest system identification. The method may further include, based at least in part on a determination that two of the plurality of network nodes have a highest number of adjacencies, identifying the second network node of the plurality of network nodes with an updated DIS priority change algorithm, and assigning the second network node to be the DIS based on the updated DIS priority change algorithm.

The method may further include determining every instance of a second period of time whether the connectivity between the first network node and the other network nodes of the plurality of network nodes within the network is in the synchronous state with the adjacencies of the first network node with the other network nodes of the plurality of network nodes within the network. Based at least in part on a determination that the connectivity between the first network node and the other network nodes of the plurality of network nodes within the network is in the synchronous state with the adjacencies of the first network node with the other network nodes of the plurality of network nodes within the network, the method may include executing the DIS priority change algorithm to change the DIS from the second network node to the first network node.

Monitoring the connectivity between the first network node and the other network nodes of the plurality of network nodes within the network may be based on DIS intermediate system to intermediate system (IS-IS) hello packets, a pseudo node (PSN) link state packet (LSP), or combinations thereof. Further, executing the DIS election operation to determine the first network node among the plurality of network nodes as the DIS for the network may include identifying the first network node of the plurality of network nodes with a highest system identification, and assigning the first network node to be the DIS.

Examples described herein also provide a network node including one or more processors, and one or more non-transitory computer-readable media storing instructions that, when executed by the one or more processors, cause the one or more processors to perform a number of operations. The operations may include establishing a communication pathway between a plurality of network nodes within a network. The plurality of network nodes have adjacencies with one another. The operations may further include executing a designated intermediate system (DIS) election operation to determine a first network node among the plurality of network nodes as the DIS for the network, and creating a first pseudo node for the first network node, the first pseudo node including a pseudo node link state packet (PSN-LSP).

The operations further include with each network node of the plurality of network nodes monitoring connectivity between the first network node and the other network nodes of the plurality of network nodes within the network, and monitoring adjacencies with the other network nodes of the plurality of network nodes within the network. The operations further include determining whether the connectivity between the first network node and the other network nodes of the plurality of network nodes within the network is in a synchronous state with the adjacencies with the other network nodes of the plurality of network nodes within the network. Based at least in part on a determination that the connectivity between the first network node and the other network nodes of the plurality of network nodes within the network is in a non-synchronous state with the adjacencies with the other network nodes of the plurality of network nodes within the network, and monitoring the non-synchronous state for a first period of time. Based at least in part on a determination that the non-synchronous state exists after the first period of time, executing a DIS priority change algorithm to change the DIS from the first network node to a second network node, the second network node creates a second pseudo node including a second PSN-LSP.

The network may be an overlay transport virtualization (OTV) LAN network in which the first network node executes an IS-IS protocol in a control plane. Executing the DIS priority change algorithm includes assigning the second network node to be the DIS based at least in part on identifying the second network node of the plurality of network nodes with a highest number of adjacencies, identifying the second network node of the plurality of network nodes with a highest system identification, identifying the second network node of the plurality of network nodes with an updated DIS priority change algorithm, identifying the second network node of the plurality of network nodes with a relatively higher DIS priority field than any other network node of the plurality of network nodes, or combinations thereof.

The operations further include disqualifying the first network node and any other network node of the plurality of network nodes lacking connectivity with the first network node from being assigned as the DIS. The operations further include determining every instance of a second period of time whether the connectivity between the first network node and the other network nodes of the plurality of network nodes within the network is in a synchronous state with the adjacencies of the first network node with the other network nodes of the plurality of network nodes within the network. The operations further include, based at least in part on a determination that the connectivity between the first network node and the other network nodes of the plurality of network nodes within the network is in the synchronous state with the adjacencies of the first network node with the other network nodes of the plurality of network nodes within the network, executing the DIS priority change algorithm to change the DIS from the second network node to the first network node.

Examples described herein also provide a non-transitory computer-readable medium storing instructions that, when executed, causes a processor to perform operations, including establishing a communication pathway between a plurality of network nodes within a network. The plurality of network nodes have adjacencies with one another. The operations further include executing a designated intermediate system (DIS) election operation to determine a first network node among the plurality of network nodes as the DIS for the network, and creating a first pseudo node for the first network node, the first pseudo node including a pseudo node link state packet (PSN-LSP). The operations further include, with each network node of the plurality of network nodes, monitoring connectivity between the first network node and the other network nodes of the plurality of network nodes within the network, and monitoring adjacencies with the other network nodes of the plurality of network nodes within the network. The operations further include determining whether the connectivity between the first network node and the other network nodes of the plurality of network nodes within the network is in a synchronous state with the adjacencies with the other network nodes of the plurality of network nodes within the network.

The operations further include, based at least in part on a determination that the connectivity between the first network node and the other network nodes of the plurality of network nodes within the network is in a non-synchronous state with the adjacencies with the other network nodes of the plurality of network nodes within the network, monitoring the non-synchronous state for a first period of time. The operations further include, based at least in part on a determination that the non-synchronous state exists after the first period of time, executing a DIS priority change algorithm to change the DIS from the first network node to a second network node, the second network node creating a second pseudo node including a second PSN-LSP.

Executing the DIS priority change algorithm includes identifying the second network node of the plurality of network nodes with a highest number of adjacencies, identifying the second network node of the plurality of network nodes with a highest system identification, identifying the second network node of the plurality of network nodes with an updated DIS priority change algorithm, identifying the second network node of the plurality of network nodes with a relatively higher DIS priority field than any other network node of the plurality of network nodes, or combinations thereof, and assigning the second network node to be the DIS.

The operations further include determining every instance of a second period of time whether the connectivity between the first network node and the other network nodes of the plurality of network nodes within the network is in the synchronous state with the adjacencies of the first network node with the other network nodes of the plurality of network nodes within the network. The operations further include based at least in part on a determination that the connectivity between the first network node and the other network nodes of the plurality of network nodes within the network is in the synchronous state with the adjacencies of the first network node with the other network nodes of the plurality of network nodes within the network, executing the DIS priority change algorithm to change the DIS from the second network node to the first network node. Monitoring the connectivity between the first network node and the other network nodes of the plurality of network nodes within the network is based on DIS intermediate system to intermediate system (IS-IS) hello packets, a pseudo node (PSN) link state packet (LSP), or combinations thereof.

Additionally, the techniques described in this disclosure may be performed as a method and/or by a system having non-transitory computer-readable media storing computer-executable instructions that, when executed by one or more processors, performs the techniques described above.

Example Embodiments

Turning now to the figures, FIG. 1 illustrates a block diagram of a communication system 100 for intelligently maintaining connectivity in a network environment, according to an example of the principles described herein. The communication system 100 of FIG. 1 may be associated with maintaining layer-2 connectivity in the network environment. The communication system 100 may include a plurality of network nodes 102-1, 102-2, 102-3, 102-4, . . . 102-N (collectively referred to herein as network node(s) 102), where N is any integer greater than or equal to 1.

Also depicted in FIG. 1, a network 106 where a single network node 102 may offer connectivity to other network nodes 102 within the network 106. The network 106 may serve as a transport mechanism for data that propagates between the network nodes 102. In the example of FIG. 1, a local area network (LAN) may couple the network nodes 102 to each other where a single designated intermediate system (DIS) is indicated for one of the network nodes 102. In the examples described herein, network nodes 102-1 may be initially assigned as the DIS. The role of the DIS in a LAN is to maintain the single-hop connectivity for all the other nodes in the network.

FIG. 1 is depicting the evolution of a network system that is associated with an overlay network. An overlay network may offer layer-2 connectivity between remote sites over a transport network. The overlay network may include one or more edge devices on each site interconnected with a control plane protocol across a transport network. Each site may include one or more edge devices, as well as other internal routers, switches, or servers. Hence, two sites may be connected through edge devices to a transport network (e.g., to create a virtual overlay network). The systems and methods described herein may be applied in any overlay network and is also applicable to any LAN.

In one example, a communication system 100 may be applied to an overlay transport virtualization (OTV) scenario. OTV is a Cisco proprietary protocol for relaying layer 2 communications between layer 3 (L3) computer networks. In an OTV scenario, multiple edge devices across layer-2 (L2) sites communicate with each other via a layer-3 (L3) or an L2 cloud using an intermediate system to intermediate system (IS-IS) protocol in the control plane. The IS-IS protocol is a routing protocol designed to move information efficiently within a computer network, a group of physically connected computers or similar devices. It accomplishes this by determining the best route for data through a packet switching network. The IS-IS protocol may be defined in ISO/IEC 10589:2002 as an international standard within the Open Systems Interconnection (OSI) reference design. The Internet Engineering Task Force (IETF) republished IS-IS in RFC 1142 and/or RFC 7142, the entirety of which are incorporated herein by reference. IS-IS is a link-state protocol and uses the Dijkstra algorithm for computing the best path through the network. The IS-IS protocol supports variable length subnet masks, may use multicast to discover neighboring routers using hello packets, and may support authentication of routing updates.

IS-IS is an OSI Layer 2 protocol. IS-IS does not use internet protocol (IP) to carry routing information messages and is neutral regarding the type of network addresses for which it may route. This allows IS-IS to be easily used to support internet protocol version 6 (IPv6). IS-IS routers (e.g., nodes) may build a topological representation of a network that indicates the subnets which each IS-IS router (e.g., node) may reach, and the lowest-cost (shortest) path to a subnet is used to forward traffic. IS-IS adjacency may be either broadcast or point-to-point. Further, IS-IS utilizes Hello packets. These IS-IS Hello (IIH) packets are exchanged periodically between any two nodes to establish and maintain adjacency. Based on the negotiation, one of the nodes is selected as a DIS. The IIH packet is sent separately for Layer-1 or Layer-2.

Logistically, the OTV-IS-IS control network has special inherent properties such as, for example, it is a single hop LAN network. An overlay network maps media access control (MAC) addresses to Internet protocol (IP) addresses of the edge devices. Once the OTV framework identifies the correct edge device to which to send a layer-2 frame, OTV encapsulates the frame and, subsequently, sends the resulting IP packet using transport network routing protocols. In one example, OTV may support one or more separate overlay networks, where each overlay network may support one or more virtual LANs (VLANs).

Each of the elements of FIG. 1 may couple to one another through simple interfaces (as illustrated) or through any other suitable connection (wired or wireless), which provides a viable pathway for network communications. For example, the connections between the network nodes 102 may be accomplished via a number of dense wave division multiplexing (DWDM) in a data center interconnect. In this example arrangement, the underlay network may not always be robust enough in terms of resiliency, and when the underlay connectivity is not robust, failures on the underlay partitions the LAN in a manner such that overlay-LAN looks partitioned. The present systems and methods overcome any partitioning in the network in this manner.

Additionally, any one or more of the elements of FIG. 1 (e.g., the network nodes 102) may be combined or removed from the architecture based on particular configuration needs. The communication system 100 may include a configuration capable of transmission control protocol/Internet protocol (TCP/IP) communications for the transmission or reception of packets in a network. The communication system 100 may also operate in conjunction with a user datagram protocol/IP (UDP/IP) or any other suitable protocol where appropriate and based on particular needs.

Before detailing the operations and the infrastructure of FIG. 1, the below contextual information is provided to offer an overview of some situations that may be encountered while maintaining connectivity in a network environment. Such information is offered earnestly and for teaching purposes only and, therefore, should not be construed in any way to limit the broad applications for the present disclosure.

In the most general terms, the idea behind the DIS is similar to that of the designated router in the Open Shortest Path First (OSPF) protocol. The role of the DIS in a LAN is to maintain the single-hop connectivity for all network nodes 102 in the network 106. Any shortcomings of DIS election is alleviated for a couple of use cases as described in, for example, U.S. Pat. Nos. 8,792,384 and 8,842,517, the entireties of which are incorporated herein by reference. U.S. Pat. Nos. 8,792,384 and 8,842,517 describe use cases to minimize traffic loss (i) when a new network node 102 joins the LAN and takes over the DIS role, and (ii) when the DIS is lost and a new network node 102 becomes the DIS, respectively. These disclosures provide for older-DIS Pseudo-Node LSPs (PSN-LSPs) to temporarily have superiority such that connectivity between network nodes 102 whose adjacency did not go down is not impacted. The network would reach a steady state and traffic between two non-related network nodes 102 would not be impacted. The present systems and methods are not constrained to overlays and may be applicable to a generic LAN as well. By way of background, a link state packet (LSP) contains actual route information and may contain many type-length-values (TLVs).

The DIS creates a pseudo-node (PSN) (i.e., a virtual node) 104, where routers on a LAN (including the DIS) form an adjacency with the PSN 104 instead of forming an n*(n−1) order adjacencies with each other in a full mesh network. In operation, and in the context of a LAN environment, one of the network nodes 102 may be assigned, elected, or elects itself as the DIS. In one example, the network node 102 assigned as the DIS may be based on, for example, the network node 102 having a highest system identification (ID) (e.g., a network service access point (NSAP) address) among all network nodes 102, the network node 102 having a highest number of adjacencies with other network nodes 102 among all network nodes 102, the network node 102 having an updated DIS priority change algorithm among all network nodes 102, the network node 102 having a relatively higher DIS priority field among all network nodes 102, the network node 102 having a highest sub-network point of attachment (SNPA) (e.g., a media access control (MAC) addresses in a LAN or a local data-link connection identifier (DLCI) in a frame relay network), and combinations thereof. A PSN 104 link state protocol data unit (PDU) (LSP) represents a LAN, including all intermediate systems (ISs) attached to that LAN, just as a non-PSN-LSP represents a network node 102, including all ISs and LANs connected to the network node 102.

The DIS election may be performed preemptively. For example, if a new network node 102 boots on the LAN with a higher interface priority, it becomes the DIS, purges any old PSN-LSP, and floods a new set of LSP throughout the network 106. If a network node 102 needs an LSP because it is older than the LSP advertised by the DIS in its complete sequence number PDU (CSNP), or because it is missing an LSP that is listed in the CSNP, that network node 102 may send a partial sequence number PDU (PSNP) to the DIS and, subsequently, receive the LSP in return. A CSNP is a packet sent only by the DIS. By default, for every 10 seconds, for example, a CSNP packet may be transmitted by the DIS and contains the list of LSP ID's along with sequence number and checksum. If a network node 102 which receives a CSNP packet finds some discrepancy in its own database, it will send a PSNP request asking the DIS to send specific LSP back to it.

In an OTV paradigm builds L2 reachability information by communicating between network nodes 102 with the overlay protocol. The overlay protocol may form adjacencies with all network nodes 102. Once each network node 102 is adjacent to all its peers on the overlay, the network nodes 102 may share MAC address reachability information with other network nodes 102 that participate in the same overlay network.

In an IS-IS LAN network scenario, one of the network nodes 102 is assigned, is elected, or elects itself as the DIS based on a DIS election algorithm. The DIS election algorithm may include, for example, an algorithm which is defined in specifications that describe the IS-IS protocol. The DIS election may be preemptive in which, if a new router boots up on the LAN with a higher interface priority or a higher system ID, it becomes the DIS. The DIS assists in reducing an amount of data in a given link-state database and, further, it aids in the processing of the shortest path first (SPF) calculation. A PSN 104 may advertise the neighbor relationships of all network nodes 102 in its database update, where the actual network nodes 102 may advertise a relationship with only the PSN 104. When a PSN 104 is introduced on the link, the network nodes 102 advertise a relationship to that particular network node 102.

The DIS election process (e.g., whenever a LAN Hello message is received) means that if a Hello message being received has a higher priority than the existing DIS (or a higher MAC address if the priority is equal to the DIS priority), the originator of the Hello becomes the DIS. When the DIS is preempted (or when it resigns by lowering its priority to be below that of another router on the link), the new DIS purges the pseudo-node link state protocol data units (PDUs) (LSPs). The new DIS then originates its own LSP, and all other routers synchronize to the new DIS's link state database. In one example, after the DIS election completes, and there is a change in the DIS on the LAN, all network nodes 102 would run a shortest path first (SPF) algorithm.

Since the network nodes 102 run DIS and SPF in a distributed fashion, it is expected that there may be small windows during which existing traffic flows may be affected. Hence, in a single hop LAN network, where IS-IS is used as the interior gateway protocol (IGP), there is a small vulnerable window during which a new network node 102 is introduced into the network 106. In certain instances, this new network node 102 will eventually be elected as the DIS. However, traffic flows may be disrupted in the intervening interim. Consider an example in which there are five network nodes 102 in the LAN: network node 102-1, network node 102-2, network node 102-3, network node 102-4, and network node 102-M (with network node 102-1 being initially elected as the DIS). Furthermore, and for ease in explanation, assume that LSPs that are generated have the following LSP-IDs: A-00-00 for network node 102-1, B-00-00 for network node 102-2, C-00-00 for network node 102-3, D-00-00 for network node 102-4, and E-00-00 for network node 102-M. Also assume that the PSN 104 has an LSP ID of A-01-00; it being the PSN of network node 102-1. In the OTV network, MAC information that is announced within LSP fragments A-00-00, B-00-00, C-00-00, D-00-00, and E-00-00 are used to maintain traffic flows between members and between hosts behind the OTV network nodes 102 (e.g., network nodes A through E). If network node C (e.g., network node 102-3) joins this overlay network 106, and if it does not become the DIS of this LAN, then no issues are presented for the network (e.g., in terms of maintaining existing traffic flows).

If an assumption is made that network node C (e.g., network node 102-3) will eventually be the DIS, then a certain vulnerability occurs in the network 106. In such an instance, the LSPs in steady state (after the DIS election completes and after the LSPs are generated) are A-00-00, B-00-00, D-00-00, E-00-00, C-00-00, and C-01-00. The LSP fragments (A-00-00, B-00-00, D-00-00, and E-00-00 in this example) may show connectivity to the PSN-LSP (C-01-00) and vice versa. If network nodes A, B, D, and E (network nodes 102-1, 102-2, 102-4, and 102-M) run the SPF algorithm before receiving the final pseudo-node (LSP C-01-00) that does not list all of them (i.e., A-00, B-00, D-00, and E-00), then connectivity between them would be lost. As a result, traffic is dropped, which creates performance issues for network operators. In general, there may be unaccounted for nodes in the LAN with traffic flowing between them. If the distributed SPFs are run before the PSN-LSP is generated with the complete connectivity information, this will negatively impact existing traffic flows.

In one example, communication system 100 is configured to overcome the aforementioned shortcomings (and others) by ensuring that SPF does not incur a loss of connectivity while the final steady state LSPs are generated. Specifically, communication system 100 is configured to perform a graceful migration of PSN-LSPs in the OTV-IS-IS control plane. Existing traffic flows may be suitably maintained without dropping packets during transition scenarios. Logistically, existing traffic flows are not disrupted while new members join an OTV overlay. Without such a mechanism, in the event a member is designated as the DIS, there is a high probability of traffic disruption in the OTV framework. In contrast to such undesirable consequences, communication system 100 offers a seamless migration of current routing information, which results in minimal (or no) disturbances in the network.

In one example, the time window (during which other network nodes 102 discover network node C (e.g., network node 102-3 in the above example) is significant to the operational aspects of communication system 100. In the single-hop OTV-IS-IS LAN network, upon discovering a new node in the network (network node C (e.g., network node 102-3) in the above example), network nodes A, B, D, and E (network nodes 102-1, 102-2, 102-4, and 102-M) may run the DIS election algorithm once adjacency is completely established with the new node (network node C (e.g., network node 102-3) in the above example). It is expected that there could be skew of (at most) one Hello interval (e.g., time period $T_1$) between these events. The time periods described herein may be measured in nanoseconds, microseconds, milliseconds, etc. A timing assumption may be made (e.g., time period $T_2$) associated with network node C (e.g., network node 102-3) generating the pseudo-node LSP that shows the connectivity to all members in the LAN, and also reaching all members with this LSP. Thus, there is a time period of vulnerability of $T_1+T_2$ seconds in which a graceful migration of the DIS may occur. One aspect of communication system 100 ensures that the older pseudo-node LSP (and the connectivity to it from the members in the LAN) remains intact for a time period of $T_1+T_2$. During this time period, the older connectivity and the "new" connectivity that is being built may coexist in parallel. In one example, the time period $T_1+T_2$ may be sufficient to maintain existing traffic flows. During this time period, it is expected that the new connectivity would be formed and be ready to use because all network nodes would announce their respective connectivity to the new DIS, and vice versa from the DIS (e.g., in the pseudo-node LSP). At this point, the older information may be withdrawn gracefully. In one example, if the OTV-IS-IS Hello messages are propagating through a high-loss network, instead of a Hello-interval, the architecture may use a Hello-timeout-interval. In this example, the grace time window could then be a suitable factor of the previously designated time interval (e.g., a time period of $3*T_1+T_2$).

In regard to the adjacency update process, and in the context of the Hello messaging paradigm, there may be minimal changes to existing IS-IS Hello-state machines. Each network node 102 may be configured to maintain a list of adjacencies, along with the DIS information. Once the DIS changes, if the old DIS is still reachable, then for the grace time interval, the network nodes 102 may announce connectivity to both the old and the new DIS's PSN-LSP.

With regard to the LSP generation process, for the network nodes 102 that are not the new DIS, the only change could be to announce the connectivity to both the old and the new PSN-LSP for the grace period (e.g., using normal reachability rules). The old DIS may purge the PSN-LSP after the grace time interval expires. During this grace time interval, it should only announce the reachable members. This ensures that if network nodes 102 were lost during this grace window, they would not be picked up as being reachable during the SPF execution. The network nodes 102 may use data defining the list of adjacencies for this process.

For the actual SPF activities, and in the context of the previous example, this implies that as the network nodes 102 detect the new network node C (e.g., network node 102-3) (e.g., newly elected as the DIS), a parallel LAN is created in terms of SPF. As long as connectivity to the end network nodes 102 is available via the original PSN-LSP of network node A (e.g., network node 102-1), or the new PSN-LSP of network node C (e.g., network node 102-3), the SPF output may maintain the routes and traffic will not be disrupted. Hence, no changes may be required from an SPF perspective in some examples. In terms of having the original LAN information and the new LAN information coexisting at the same time, this may have no implications for the end results of the SPF process. One minor change might be to seed the SPF model with multiple PSN-LSPs on the same interface. SPF rules may progress after this activity has been completed. Note that the technique(s) described above are equally applicable to L3 IS-IS, where nodes on a LAN may follow the strategies described above.

Returning to FIG. 1, the network nodes 102 may include, for example edge devices, routers, gateways, etc. that may be configured for exchanging network data. The network nodes 102 may also be configured to react to the contents, the payloads, and/or the headers of packets exchanged in a network environment. Further, the network nodes 102 are meant to also include network appliances, servers, routers, switches, gateways, bridges, load balancers, firewalls, processors, edge devices, modules, or any other suitable device, component, element, or object operable to exchange information in a network environment. Moreover, the network nodes 102 may include any suitable hardware, software, components, modules, interfaces, and/or objects that facilitate the operations described herein. This may be inclusive of appropriate algorithms and communication protocols that allow for the effective exchange of data or information.

Each of network nodes 102 may execute the IS-IS protocol during their operations. An IS-IS protocol and associated network operates as follows. First, the network nodes 102 running IS-IS protocols send Hello packets from IS-IS-enabled interfaces to discover neighbors and to establish adjacencies. Network nodes 102 sharing a common data link may become IS-IS neighbors if their Hello packets contain information that meets the criteria for forming an adjacency. The criteria differ slightly depending on the type of media being used (e.g., P2P, broadcast, etc.). The criteria may include matching authentication, IS-type, MTU size, etc. The network nodes 102 may build a link-state packet (LSP) based on their local interfaces that are configured for IS-IS protocols and prefixes learned from other adjacent network nodes 102. The network nodes 102 may flood LSPs to all adjacent neighbors except the neighbor from which they received the same LSP. However, there are different forms of flooding, and also a number of scenarios in which the flooding operations may differ. The network nodes 102 may construct their link-state database from these LSPs. A shortest-path tree (SPT) may be calculated by each IS, and from this SPT, the routing table may be constructed. The routing table, the link state database, and any other suitable routing information may be stored in memory elements of the network nodes 102.

For adjacency building, neighbors on point-to-point networks become adjacent unless they do not see themselves in their neighbors' Hello PDU (and match on certain parameters). On broadcast networks and non-broadcast multi-access (NBMA) networks, the DIS may become adjacent with its neighbors. In most instances, network nodes 102 will become neighbors if the following parameters are agreed upon: 1) Layer-1, where the two network nodes 102 sharing a common network segment have their interfaces configured to be in the same area to achieve a Layer-1 adjacency; and 2) Layer-2, where two network nodes 102 sharing a common network segment are configured as Layer-2 if they are in different areas and seek to become neighbors.

The network 106 represents a series of points or nodes of interconnected communication paths for receiving and transmitting packets of information that propagate through the communication system 100. The network 106 offers a communicative interface between any of the components of FIG. 1 and remote sites and/or devices, and may be any local area network (LAN), wireless local area network (WLAN), metropolitan area network (MAN), wide area network (WAN), virtual private network (VPN), Intranet, Extranet, or any other appropriate architecture or system that facilitates communications in a network environment. The network 106 may implement a UDP/IP connection and use a TCP/IP communication language protocol in particular embodiments of the present disclosure. However, the network 106 may alternatively implement any other suitable communication protocol for transmitting and receiving data packets within communication system 100.

Figure 2:
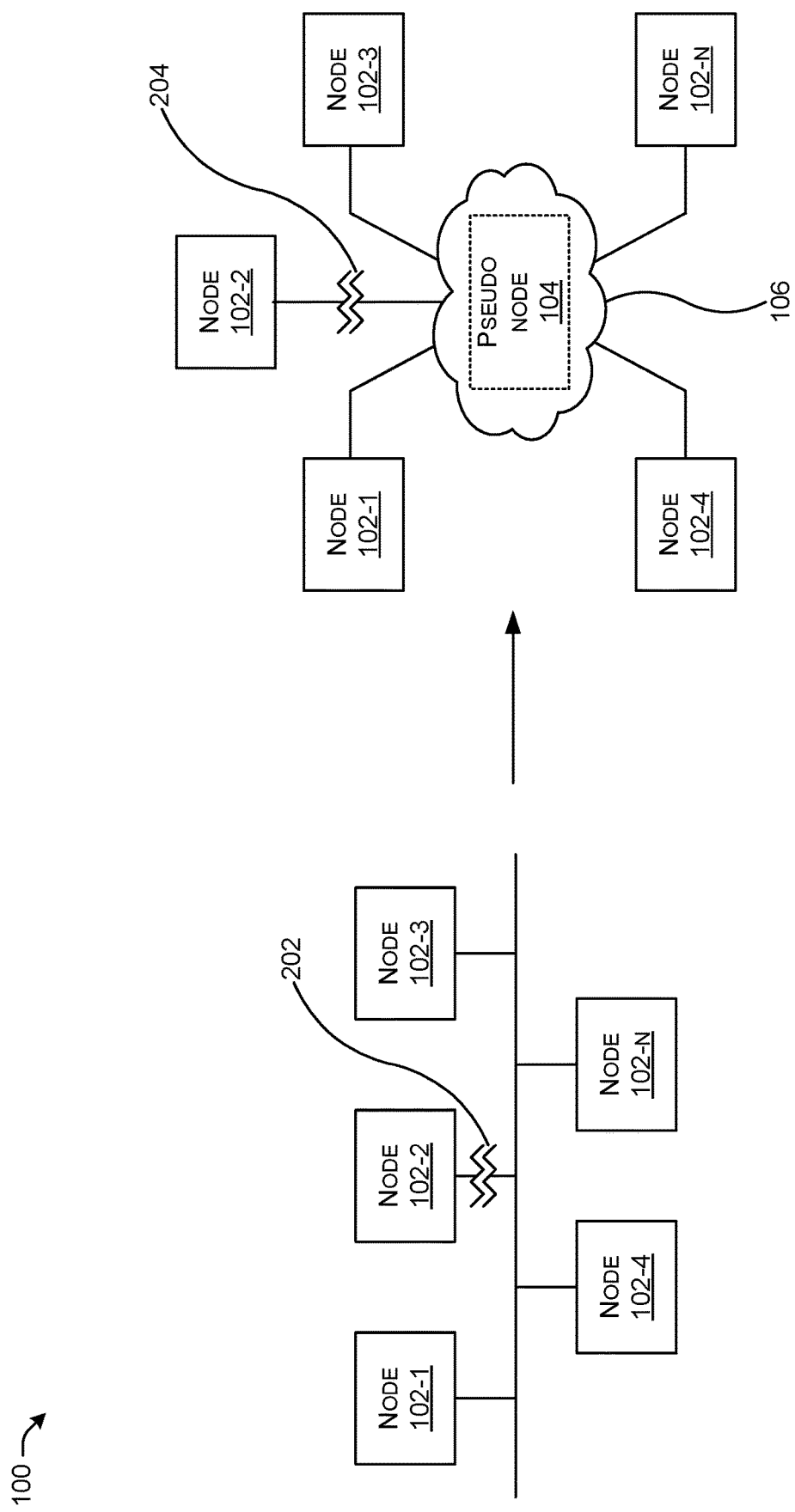
FIG. 2 illustrates the block diagram of FIG. 1 in an instance where a network connection from at least one network node is lost, according to an example of the principles described herein.

Having described the manner in which a number of network nodes 102 communicatively coupled to one another and elect a DIS, a situation to which the present systems and methods are directed will now be described. FIG. 2 illustrates the block diagram of FIG. 1 in an instance where a network connection from at least one network node 102 is lost, according to an example of the principles described herein. This instance may initially be described as a use case that stems from impacts to consumer topologies. In the examples described herein, the underlay connectivity between the network nodes 102 may not be as robust as expected, and loss of connection between one or more of the network nodes 102 causes the LAN to partition in a manner such that overlay-LAN also looks partitioned. Unfortunately, this scenario will likely lead to traffic loss between the network nodes 102. The result of loss of connectivity between one or more of the network nodes 102 is working traffic undergoing a complete loss since the DIS is unreachable between the partitions. The present systems and methods minimize such traffic loss.

An overlay network may be supported over an underlay that is relatively resilient. However, in some consumer networks, due to the constraints of the layout of the physical devices (e.g., the network nodes 102), it is sometimes not feasible to support an overlay network with the underlay network. For example, in a data center interconnect, costly DWDM devices may be used for interconnecting the network nodes 102. In this arrangement, the underlay network may not be robust enough in terms of resiliency. When the underlay network connectivity is not robust, failures on the underlay network partitions the LAN in a manner such that overlay-LAN looks partitioned as well.

In the example of FIGS. 1 and 2, we may assume that the order which the network nodes 102 should be the DIS based on, for example, the System IDs are A, B, C, D, and E (e.g., network nodes 102-1, 102-2, 102-3, 102-4, and 102-M, respectively). In one example, this may serve as a default priority among the network nodes 102. Further, it may be assumed that all the network nodes 102 can see and communication with one another and that network node A (e.g., network node 102-1) is elected as the DIS.

In the example of FIG. 2, however, due to the underlay topology not being robust enough, a connectivity issue between network node A (e.g., network node 102-1) and network node B (e.g., network node 102-2) may occur as indicated by the break in the connection at 202 within the underlay network and a corresponding break in the connection at 204 between network node 102-2 and the remainder of the network nodes 102 within the network 106. In this instance, network node A (e.g., network node 102-1) is serving as the DIS and creates a PSN 104 (e.g., a virtual node of network node 102-1) with a designation of A-01-00. In the example of FIG. 2, all other network nodes 102 (e.g., network nodes 102-3, 102-4, and 102-M) are able to see and communication with each other.

When a connection between the PSN 104 and a network node 102 is broken, the DIS deletes that network node from the PSN-LSP. Thus, in the example of FIG. 2, the DIS (e.g., network node 102-1) and the PSN 104 (A-01-00) delete network node B (network node 102-2) from the PSN-LSP of the PSN 104. As a result, connectivity between network node B (e.g., network node 102-2) and the other network nodes C, D, and E (network nodes 102-3, 102-4, 102-M, respectively) are also impacted. The present systems and methods described herein ensure that during such network instability, the data flow between nodes including the following network node 102 pairs are minimally impacted: {node B, node C}, {node B, node D}, and {node B, node E}. It is clear that without the intervention of the present systems and methods, the network traffic to and from network node B (e.g., network node 102-2) that was once forwarding, and even though connectivity exists, will now be dropped.

In the above example, if network node A (e.g., network node 102-1) were to remain as the DIS and/or the PSN 104 (A-01-00) were to remain as the PSN, the ability of network node B (e.g., network node 102-2) to communicate with other network nodes 102 is impacted since communication between network node A (e.g., network node 102-1) were to remain as the DIS and/or the PSN 104 (A-01-00) and network node B (e.g., network node 102-2) is interrupted. Thus, the present systems and methods modify the DIS election such that another network node 102 other than an affected network node (e.g., network nodes A and B; network nodes 102-1 and 102-2) may take over the role of DIS. In the example of FIG. 2, network node C (e.g., network node 102-3) may be elected as the new DIS. In this case, using the graceful introduction of the PSN-LSP of network node C (network node 102-3) will maintain connectivity between all nodes since network node C (network node 102-3) can still see and connect with all the nodes including network node B (e.g., network node 102-2). In this manner, the change in DIS will result in a minimal affect in data traffic loss among the network nodes 102.

The manner in which network node C (network node 102-3) is elected as the new DIS as opposed to, for example, network node D (e.g., network node 102-4) or network node E (network node 102-M) is described in more detail below. However, the network node 102 elected as the new DIS may, at least temporarily, have its priority increased over network node A (e.g., network node 102-1). In the example of FIG. 2, network node C (e.g., network node 102-3) may have its priority increased over network node A (e.g., network node 102-1) in order to be elected to be the DIS.

In practice, a communication pathway may be established between a plurality of network nodes 102 within the network 106. In one example, the plurality of network nodes 102 may include all network nodes 102 within the network 106 including network nodes 102-1 through 102-M as depicted in FIGS. 1 and 2. The plurality of network nodes 102 have adjacencies with one another. An adjacency may include any network node 102 to which another network node 102 may see or communicate with within the network 106.

A designated intermediate system (DIS) election operation may be executed by at least one of the network nodes 102 to determine a first network node 102 among the plurality of network nodes 102 as the DIS for the network 106. In the example of FIGS. 1 and 2, all of the network nodes 102-1 through 102-M may execute and/or participate in the DIS) election operation. Further, in the example of FIGS. 1 and 2, network node A (e.g., network node 102-1), may be elected as the DIS. In one example, election of a network node 102 as the DIS may include identifying the network node 102 of the plurality of network nodes 102 with a highest system ID, and assigning or electing that network node 102 to be the DIS.

When network node A (e.g., network node 102-1) is elected as the DIS, network node A (e.g., network node 102-1) creates a first PSN 104. It may be referred to as a "first" PSN 104 because, as described in more detail below, a second PSN 104 may be created when a second network node 102 is elected in an instance where communication with at least one of the network nodes 102 is lost. The first PSN 104 includes a first pseudo node link state packet (PSN-LSP). The LSP may include any data packet generated by a network node 102 such as the PSN 104 in a link state routing protocol that lists the neighbors of the network node 102. A link state packet may be used to efficiently determine the identity of a neighbor device, if a link failure occurs, and/or a cost of changing a link if the need arises. LSPs may be queued for transmission by the PSN 104 and time out at approximately the time of transmission. LSPs may be acknowledged by the other network nodes 102 within the network 106 and may be distributed throughout the network 106.

Once network node A (e.g., network node 102-1) creates the first PSN 104, each network node 102 within the network 106 may monitor the network 106 for any link failures that may occur between the network nodes 102 within the network 106. For example, each of the network nodes 102 may monitor connectivity between network node A (e.g., network node 102-1) and the other network nodes 102 of the plurality of network nodes 102 within the network 106. This monitoring of connectivity may be based on IS-IS Hello (IIH) packets, the PSN-LSP and/or any other sources that may identify current network connectivities between the network nodes 102. The IIH packets, the PSN-LSP and/or any other sources may be referred to herein as a connectivity list.

Further, each of the network nodes 102 may monitor adjacencies with the other network nodes 102 of the plurality of network nodes 102 within the network 106. These adjacencies may be monitored by the network nodes 102 by periodically sending hello adjacency packets to one another confirming their adjacencies. Both the monitoring of connectivities and the monitoring of hello adjacencies may be performed through the IS-IS protocol as described herein. The adjacencies may be referred to as an adjacencies list.

Each of the network nodes 102 may then determine whether the connectivity between network node A (e.g., network node 102-1) and the other network nodes 102 of the plurality of network nodes 102 within the network 106 is in a synchronous state with the adjacencies with the other network nodes 102 of the plurality of network nodes 102 within the network 106. Stated another way, each of the network nodes 102 may then determine whether the connectivity list is synchronous with the adjacencies list. The connectivity list (e.g., IIH packets, the PSN-LSP, etc.) should be identical to the adjacencies list in a steady state of the network 106. However, in the event that a connection between any two network nodes 102 is lost, the connectivity list goes out of synchronization with the adjacencies list. In this state, the number of entities identified in the adjacencies list may be higher than the number of entities listed in the connectivity list as announced by the DIS.

In one example, the network nodes 102 may monitor the non-synchronous state for a period of time ($T_3$) before triggering a DIS priority change algorithm. This time period allows for normal operations of the existing DIS, network node A (e.g., network node 102-1) in the example described herein, bringing in a new network node into the network 106. Thus, a handoff of DIS operations is not completed until after time period $T_3$ so that the network may operate as described above until a new DIS has been selected or the lost connection(s) have been fixed. At the end of time period $T_3$, the network nodes 102 will decide whether to increment the DIS priority temporarily or take no action.

In the example above, nodes B, C, D, and E will all run the DIS priority change algorithm after $T_3$ seconds of noting that the link between network node A (e.g., network node 102-1) and network node B (e.g., network node 102-2) connectivity is missing in the IIH and/or PSN-LSP of network node A (e.g., network node 102-1). Network node C (e.g., network node 102-3) maintains four local adjacencies in its adjacencies list. Further, like network node C (e.g., network node 102-3), the hello packets from network node D (e.g., network node 102-4) and network node E (e.g., network node 102-M) have 4 adjacencies in their respective neighbor lists. However, in contrast, network node A (e.g., network node 102-1) and network node B (e.g., network node 102-2) each have 3 adjacencies in their respective adjacencies lists. Thus, at least one of network node C (e.g., network node 102-3), network node D (e.g., network node 102-4) and network node E (e.g., network node 102-M) will be elected as the new DIS. In this manner, based at least in part on a determination that the connectivity between network node A (e.g., network node 102-1) and the other network nodes 102 of the plurality of network nodes 102 within the network 106 is in a non-synchronous state with the adjacencies with the other network nodes 102 of the plurality of network nodes 102 within the network 106, the network nodes 102 monitor the non-synchronous state for a period of time (e.g., $T_3$) and, based at least in part on a determination that the non-synchronous state exists after the period of time (e.g., $T_3$), executing a DIS priority change algorithm to change the DIS from network node A (e.g., network node 102-1) to a second network node such as, for example, network node C (e.g., network node 102-3). The second network node, once elected as the DIS, may then create a second PSN 104 including a second PSN-LSP.

In the examples described herein, network node C (network node 102-3), network node D (network node 102-4), and network node E (network node 102-M) will all run the DIS priority change algorithm. In the execution of the DIS priority change algorithm, network node C (network node 102-3), network node D (network node 102-4), and network node E (network node 102-M) may determine which network node 102 among themselves is to be the new DIS and ignoring network node A (e.g., network node 102-1) and network node B (e.g., network node 102-2). In the above example, network node C (network node 102-3) may be elected to take over the role of DIS. In one example, in order for network node C (network node 102-3) to become the new DIS, it may set its DIS priority in a way such that it can take over the role from network node A (e.g., network node 102-1). In this example, network node C (network node 102-3) may set its DIS priority field to a higher value such as, for example, a maximum value to overcome any non-default values.

Network node C (network node 102-3) may also set a timer for period of time $T_4$, such that the role of network node C (network node 102-3) as the DIS is temporary and will check every period of time $T_4$ to see if network node A (network node 102-1), the rightful DIS, has the same set of neighbors listed in its IIH and/or PSN-LSP as originally presented or as included in network node C (network node 102-3). In the event that network node C (network node 102-3) does see that the IIH and/or PSN-LSP of network node A (network node 102-1) has changed to include IIH and/or PSN-LSP as originally presented or as included in network node C (network node 102-3), network node C (network node 102-3) may change its DIS priority to a user-defined or default values that allows network node A (network node 102-1) to once again be elected as the DIS.

In this manner, the systems and methods described herein include determining every instance of a second period of time whether the connectivity between the network node A (network node 102-1) and the other network nodes 102 of the plurality of network nodes 102 within the network 106 is in the synchronous state with the adjacencies of network node A (network node 102-1) with the other network nodes 102 of the plurality of network nodes 102 within the network 106. Based at least in part on a determination that the connectivity between the network node A (network node 102-1) and the other network nodes 102 of the plurality of network nodes 102 within the network 106 is in the synchronous state with the adjacencies of network node A (network node 102-1) with the other network nodes 102 of the plurality of network nodes 102 within the network 106, the DIS priority change algorithm may be executed to change the DIS from the network node C (network node 102-3) to network node A (network node 102-1). Once this is accomplished, the normal operation of the protocol will be executed and network node A (network node 102-1) will once again obtain is DIS designation. By ensuring that network node C (network node 102-3) becomes the DIS, as temporary as it may be, the present systems and methods are able to keep the original traffic between {node B, node C}, {node B, node D}, and {node B, node E} functional. There may be a minimal drop in traffic for a maximum period of time $T_3$ as opposed to a complete black holing of traffic while network node C (network node 102-3) takes over the DIS role.

In light of the above, the manner in which the DIS priority change algorithm executes may include identifying a network node 102 such as network node C (network node 102-3) of the plurality of network nodes 102 with a highest number of adjacencies. Further, the DIS priority change algorithm may identify the network node 102 of the plurality of network nodes 102 with a highest system ID and prioritize for that network node 102. Still further, the DIS priority change algorithm may identify the network node 102 of the plurality of network nodes 102 with an updated DIS priority change algorithm. In this example, the network nodes 102 may be updated from time to time with a newer version of the DIS priority change algorithm. Because the updated version of the DIS priority change algorithm may supersede previous versions, the present systems and methods may place priority in a network node 102 that has received the updated version of the DIS priority change algorithm over a network node 102 that has not. Even still further, the DIS priority change algorithm may identify the network node 102 of the plurality of network nodes 102 with a relatively higher DIS priority field than any other network node 102 of the plurality of network nodes 102. In the examples described herein, the DIS priority change algorithm may identify any combinations of the above parameters in identifying which network node 102 is to be elected or assigned as the new DIS.

In one example, based at least in part on a determination that two of the plurality of network nodes 102 such as any two of network node C (network node 102-3), network node D (network node 102-4), and network node E (network node 102-M) have a highest number of adjacencies. In the above example, this is, in fact, the case as each of these nodes include four adjacencies in their respective adjacencies lists. The system and methods described herein may further identify the network node 102 of the plurality of network nodes 102 with a highest system ID, and assigning that network node 102 with the highest system ID to be the DIS. In this type of tie breaking process, when there are two conflicting network nodes 102 that have similar qualifications to be elected or assigned as the new DIS, one or more of the above-described parameters may be used to make this determination.

The above systems and methods address most IS-IS deployment scenarios. However, there may be an instance in which a network may be partitioned into two separate groups of network nodes 102 that may lead to a conflicting DIS election process. For example, network nodes {a, b, c, and p} may be able to communication with one another, and, separately, network nodes {d, e, f, and q} may be able to communication with one another. Additionally, network nodes p and q may be able to communication with one another. In this example, the original network 106 included eight nodes; nodes a, b, c, d, e, f, p, and q. The connectivity failures in this example may create a situation where nodes p and q both assert the DIS role and may lead to a DIS-war. In this example, automated DIS priority change algorithm may be limited to take effect on a network node 102 such as network node p in this example, based on a tie breaker rule of highest system ID in case of equal adjacencies once every time period $T_3$ with an exponential backup in place. As a result, only p or q will eventually win, the other network node 102 falling back to its configured value as described herein. Although in this scenario assuming p is the winner and elected as the DIS, connectivity between a number of other network nodes such as between and to {d, e, and f} may be broken. However, because multiple underlay connection failures between the network nodes 102 is rare, the present systems and methods attempt to maintain connectivity between the maximal number of network nodes that may remain connected in the presence of these multiple underlay failures. The present systems and methods correct customer deployments scenarios where relatively fewer number of failures exist before they are corrected.

Figure 3:
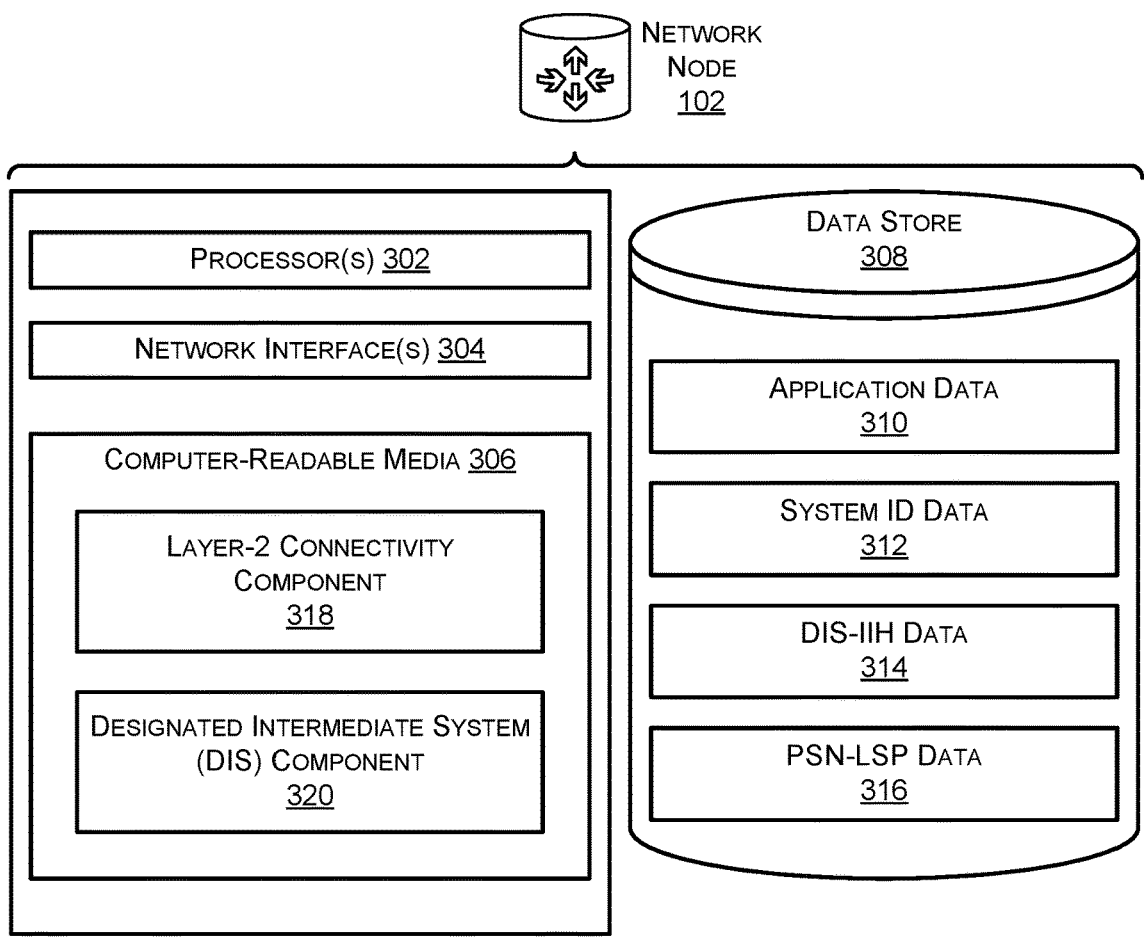
FIG. 3 is a component diagram of example components of a network node including a designated intermediate system (DIS) component, according to an example of the principles described herein.

FIG. 3 is a component diagram 300 of example components of a network node 102 including a designated intermediate system (DIS) component, according to an example of the principles described herein. As illustrated, the network node 102 may include one or more hardware processor(s) 302 configured to execute one or more stored instructions. The processor(s) 302 may comprise one or more cores. Further, the network node 102 may include one or more network interfaces 304 configured to provide communications between the network node 102 and other devices, such as devices associated with the system architecture of FIG. 1 including the other network nodes 102, the PSN 104, and/or other systems or devices associated with the network node 102 and/or remote from the network node 102. The network interfaces 304 may include devices configured to couple to personal area networks (PANs), wired and wireless local area networks (LANs), wired and wireless wide area networks (WANs), and so forth. For example, the network interfaces 304 may include devices compatible with the network nodes 102, the PSN 104, and/or other systems or devices associated with the network node 102.

The network node 102 may also include computer-readable media 306 that stores various executable components (e.g., software-based components, firmware-based components, etc.). In one example, the computer-readable media 306 may include, for example, working memory, random access memory (RAM), read only memory (ROM), and other forms of persistent, non-persistent, volatile, non-volatile, and other types of data storage. In addition to various components discussed herein, the computer-readable media 306 may further store components to implement functionality described herein. While not illustrated, the computer-readable media 306 may store one or more operating systems utilized to control the operation of the one or more devices that comprise the network node 102. According to one example, the operating system comprises the LINUX operating system. According to another example, the operating system(s) comprise the WINDOWS SERVER operating system from MICROSOFT Corporation of Redmond, Wash. According to further examples, the operating system(s) may comprise the UNIX operating system or one of its variants. It may be appreciated that other operating systems may also be utilized.

Additionally, the network node 102 may include a data store 308 which may comprise one, or multiple, repositories or other storage locations for persistently storing and managing collections of data such as databases, simple files, binary, and/or any other data. The data store 308 may include one or more storage locations that may be managed by one or more database management systems. The data store 308 may store, for example, application data 310 defining computer-executable code utilized by the processor 302 to execute computer code to perform the methods described herein including, for example, the components 318 and 320 described below.

Further, the data store 308 may store system ID data 312. The system ID data 312 may include any data defining the system ID of the plurality of network nodes 102 within the network 106. The system ID data 312 may be used to prioritize one network node 102 over another network node 102 in instances where a DIS election is taking place and two network nodes 102 are competing to be elected as the new DIS.

The data store 308 may further store DIS-IIH data 314. As described herein, the network nodes 102 running IS-IS protocols may send Hello packets from IS-IS-enabled interfaces (e.g., network interface(s) 304) to discover neighbors and to establish adjacencies. The network nodes 102 sharing a common data link will become IS-IS neighbors if their Hello packets contain information that meets the criteria for forming an adjacency. The DIS-IIH data 314 may include any data that defines the adjacencies. All the network nodes 102 within the network 106 may receive the DIS-IIH data 314 from, for example, the PSN 104.

The data store 308 may further store PSN-LSP data 316. The PSN-LSP data 316 may be generated by the network node 102 elected as the DIS. The network node 102 elected as the DIS reports all neighbors in the network 106 to all other network nodes 102 within the network 106 via, for example, the PSN 104.

In relation to the application data 310, the system ID data 312, the DIS-IIH data 314, and the PSN-LSP data 316, the computer-readable media 306 may store portions, or components, of a layer-2 (L2) connectivity component 318 and a designated intermediate system (DIS) component 320. The L2 connectivity component 318 of the computer-readable media 306 may include any executable code to provide connectivity between the network nodes 102, the PSN 104, and other devices described herein in order to provide the IS-IS protocol networking as described herein and ensure that the network nodes 102 and PSN 104 are communicatively coupled to one another. In some example systems, upon discovering that the DIS has moved such as, for example from network node A (e.g., network node 102-1) to network node C (network node 102-3) as described above, adjacent nodes immediately eliminate their connectivity from the old DIS, and establish connectivity to the new DIS.

In contrast to these operations, the L2 connectivity component 318 are configured to maintain connectivity to the old DIS for a configurable period of time, while establishing connectivity to the new DIS in instances where the DIS priority change algorithm is executed.

The DIS component 320 of the computer-readable media 306 may include any executable code to provide for a change in DIS and creation of a PSN 104 as described herein. As mentioned above, the DIS component 320 may be executed by a number of the network nodes 102 when a connection between two network nodes 102 fails. The DIS component 320 may include and/or cause the DIS priority change algorithm to be executed in order to elect a new DIS among the network nodes 102.

The L2 connectivity component 318 and the DIS component 320 are included within the network nodes 102 to achieve, or to foster, the connectivity operations, as outlined herein. In one example, this feature may be provided externally to these elements, or included in some other network device to achieve this intended functionality. In one example, these elements can include software (or reciprocating software) that can coordinate in order to achieve the operations, as outlined herein. In one example, one or all of these devices may include any suitable algorithms, hardware, software, components, modules, interfaces, or objects that facilitate the operations thereof.

Figure 4:
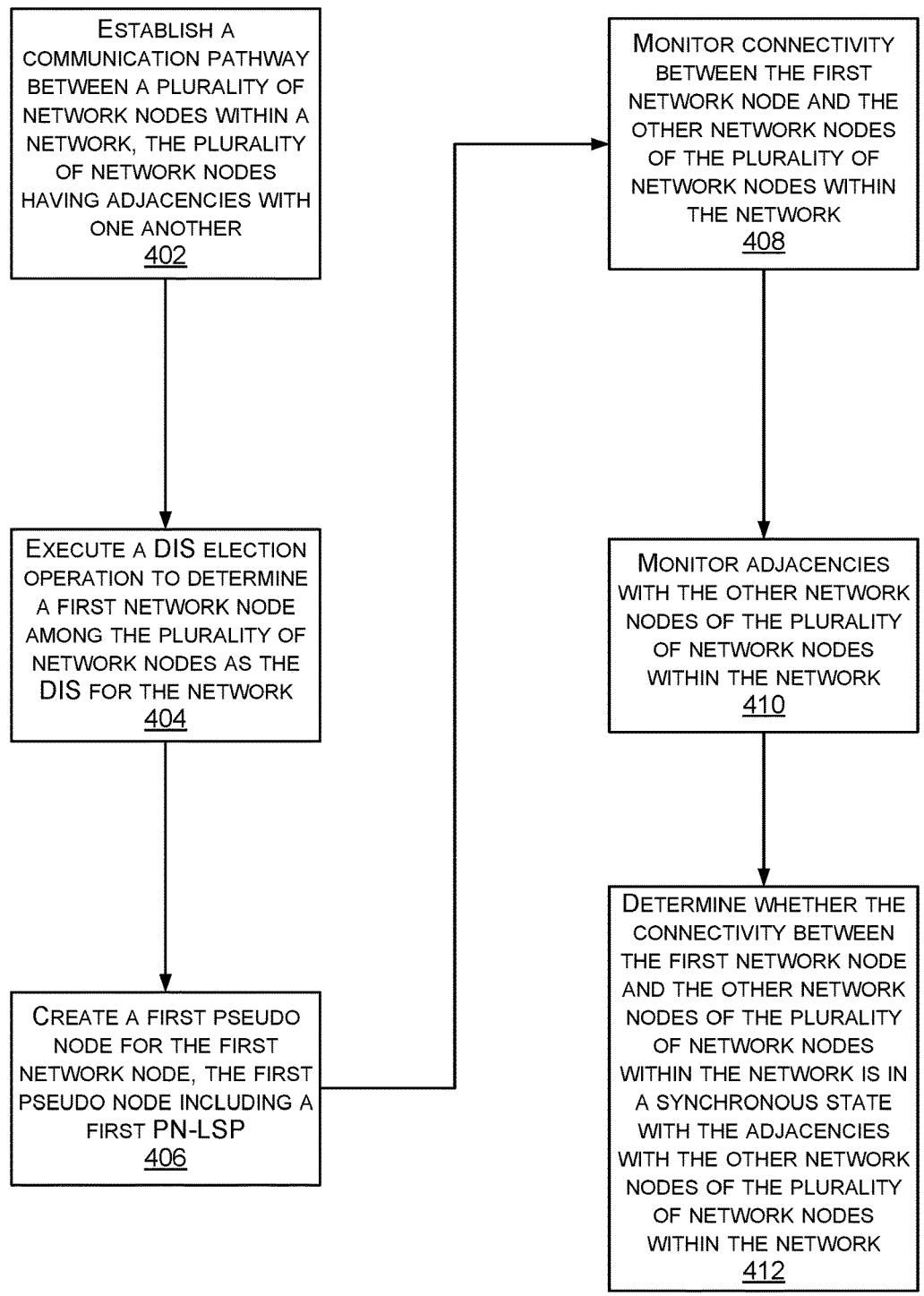
FIG. 4 illustrates a flow diagram of an example method for changing a designated intermediate system (DIS) within a network, according to an example of the principles described herein.

FIG. 4 illustrates a flow diagram of an example method 400 for changing a designated intermediate system (DIS) within a network 106, according to an example of the principles described herein. The method 400 may include, at 402, establishing a communication pathway between a plurality of network nodes 102 within a network 106. The plurality of network nodes 102 have adjacencies with one another. The adjacencies may be defined by the DIS-IIH data 31 and/or the PSN-LSP data 316 included in the data stores 308 of the network nodes 102.

At 404, the method may further include executing a designated intermediate system (DIS) election operation to determine a first network node 102 among the plurality of network nodes 102 as the DIS for the network. In the example described herein, network node A (e.g., network node 102-1) is selected as the first or original DIS. Network node A (e.g., network node 102-1) creates a first pseudo node 104 at 406. The first PSN 104 may include a first pseudo node link state packet (PSN-LSP). As described above, the PSN-LSP that lists the neighbors of the network node 102.

At 408 and 410, with each network node 102 of the plurality of network nodes 102, the systems may monitor connectivity between network node A (e.g., network node 102-1) and the other network nodes 102 of the plurality of network nodes 102 within the network 106, and monitoring adjacencies with the other network nodes 102 of the plurality of network nodes 102 within the network 106. At 412, the network nodes 102 may each determine whether the connectivity between network node A (e.g., network node 102-1) and the other network nodes 102 of the plurality of network nodes 102 within the network 106 is in a synchronous state with the adjacencies with the other network nodes 102 of the plurality of network nodes 102 within the network 106. The result of this determination at 412 informs the system as to whether the DIS should change via the execution of the DIS priority change algorithm. More details regarding this method 400 is described below in connection with FIG. 5.

Figure 5:
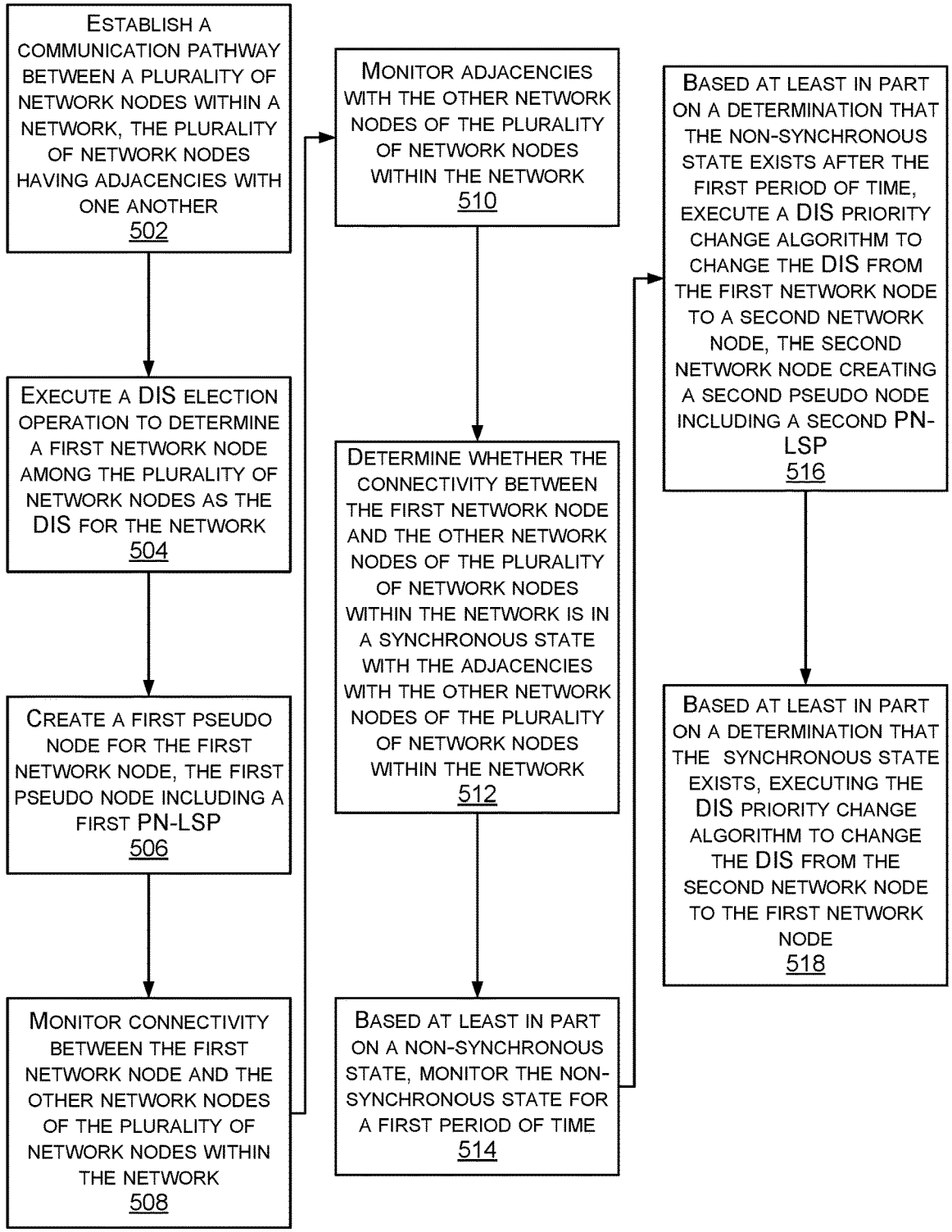
FIG. 5 illustrates a flow diagram of an example method for changing a designated intermediate system (DIS) within a network, according to an example of the principles described herein.

FIG. 5 illustrates a flow diagram of an example method 500 for changing a designated intermediate system (DIS) within a network 106, according to an example of the principles described herein. The method 500 may include, at 502, establishing a communication pathway between a plurality of network nodes 102 within a network 106. The plurality of network nodes 102 have adjacencies with one another. The adjacencies may be defined by the DIS-IIH data 31 and/or the PSN-LSP data 316 included in the data stores 308 of the network nodes 102.

At 504, the method may further include executing a designated intermediate system (DIS) election operation to determine a first network node 102 among the plurality of network nodes 102 as the DIS for the network. In the example described herein, network node A (e.g., network node 102-1) is selected as the first or original DIS. Network node A (e.g., network node 102-1) creates a first pseudo node 104 at 506. The first PSN 104 may include a first pseudo node link state packet (PSN-LSP). As described above, the PSN-LSP that lists the neighbors of the network node 102.

At 508 and 510, with each network node 102 of the plurality of network nodes 102, the systems may monitor connectivity between network node A (e.g., network node 102-1) and the other network nodes 102 of the plurality of network nodes 102 within the network 106, and monitoring adjacencies with the other network nodes 102 of the plurality of network nodes 102 within the network 106. At 512, the network nodes 102 may each determine whether the connectivity between network node A (e.g., network node 102-1) and the other network nodes 102 of the plurality of network nodes 102 within the network 106 is in a synchronous state with the adjacencies with the other network nodes 102 of the plurality of network nodes 102 within the network 106. The result of this determination at 512 informs the system as to whether the DIS should change via the execution of the DIS priority change algorithm.

Thus, at 514, based at least in part on a determination that the connectivity between network node A (e.g., network node 102-1) and the other network nodes 102 of the plurality of network nodes 102 within the network 106 is in a non-synchronous state with the adjacencies with the other network nodes 102 of the plurality of network nodes 102 within the network 106, the network nodes 102 may monitor the non-synchronous state for a first period of time (e.g., $T_3$). Based at least in part on a determination that the non-synchronous state exists after the first period of time (e.g., $T_3$), the network nodes 102 may execute, at 516, a DIS priority change algorithm to change the DIS from the network node A (e.g., network node 102-1) to a second network node such as network node C (e.g., network node 102-3) as indicated in the above examples. Network node C (e.g., network node 102-3) may create a second PSN 104 including a second PSN-LSP for flooding to the other network nodes 102. Because network node C (e.g., network node 102-3) is communicatively coupled to all network nodes 102 within the network 106 including network node A (e.g., network node 102-1) and network node B (e.g., network node 102-2) that are the subject of the communication issue in the above examples, all traffic between all the network nodes 102 is able to continue unimpeded and no data packets are lost.

Further, because the election of network node C (e.g., network node 102-3) is temporary, at 518, the DIS priority change algorithm may be executed based at least in part on a determination that the synchronous state exists after a second period of time (e.g., $T_4$) in order to change the DIS from network node C (e.g., network node 102-3) back to network node A (e.g., network node 102-1).

Figure 6:
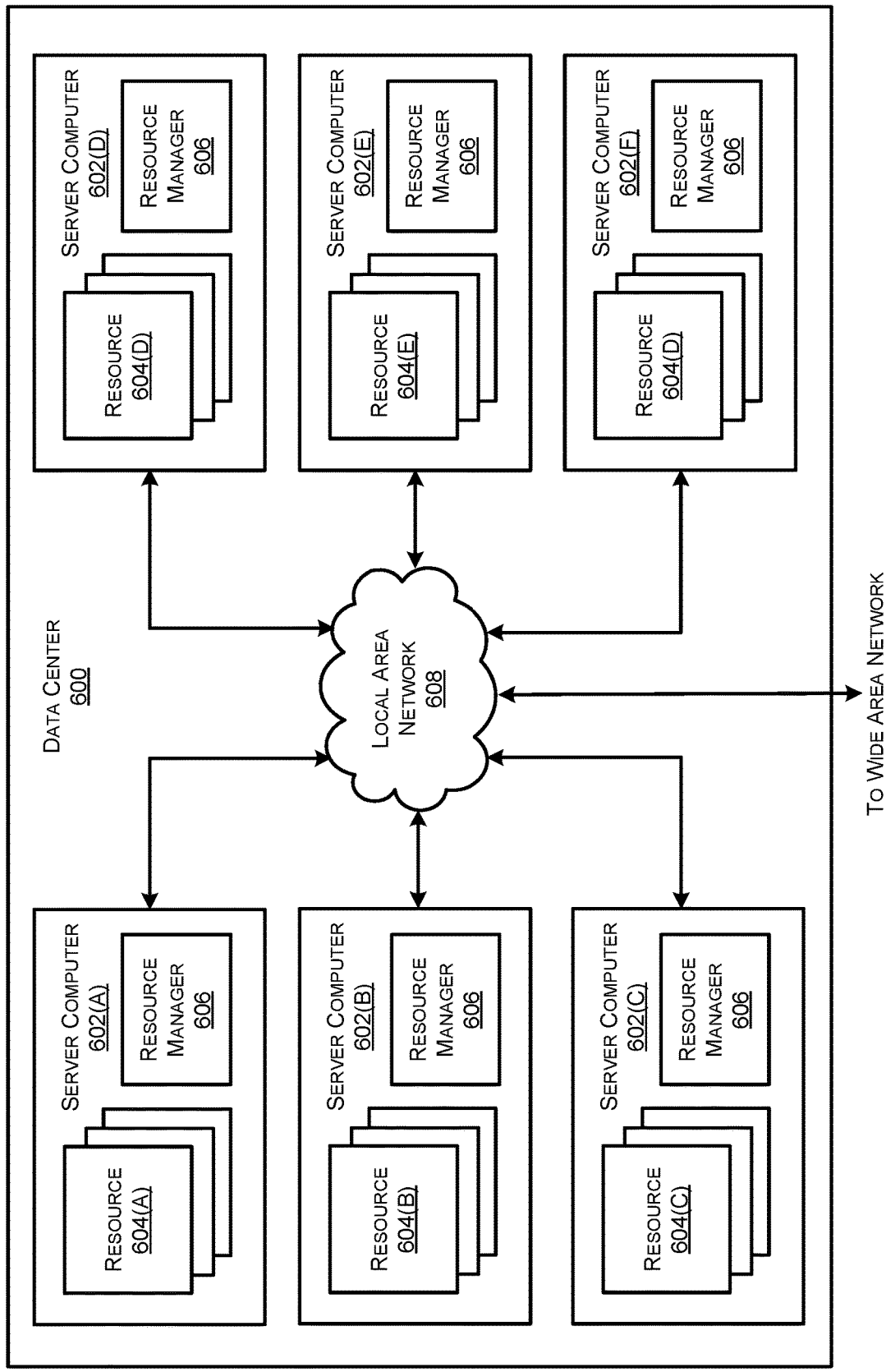
FIG. 6 illustrates a computing system diagram illustrating a configuration for a data center that may be utilized to implement aspects of the technologies disclosed herein.

FIG. 6 illustrates a computing system diagram illustrating a configuration for a data center 600 that may be utilized to implement aspects of the technologies disclosed herein. The example data center 600 shown in FIG. 6 includes several server computers 602A-602F (which might be referred to herein singularly as "a server computer 602" or in the plural as "the server computers 602) for providing computing resources. In some examples, the resources and/or server computers 602 may include, or correspond to, any type of networked device described herein. Although described as servers, the server computers 602 may comprise any type of networked device, such as servers, switches, routers, hubs, bridges, gateways, modems, repeaters, access points, etc.

The server computers 602 may be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, virtual private networks (VPNs), and others. Some of the server computers 602 may also be configured to execute a resource manager 606 capable of instantiating and/or managing the computing resources. In the case of VM instances, for example, the resource manager 606 may be a hypervisor or another type of program configured to enable the execution of multiple VM instances on a single server computer 602. Server computers 602 in the data center 600 may also be configured to provide network services and other types of services.

In the example data center 600 shown in FIG. 6, an appropriate LAN 608 is also utilized to interconnect the server computers 602A-802F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 600, between each of the server computers 602A-802F in each data center 600, and, potentially, between computing resources in each of the server computers 602. It may be appreciated that the configuration of the data center 600 described with reference to FIG. 6 is merely illustrative and that other implementations may be utilized.

In some examples, the server computers 602 and/or the computing resources 604 may each execute/host one or more tenant containers and/or virtual machines to perform techniques described herein.

In some instances, the data center 600 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 604 provided by the cloud computing network may include various types of computing resources, such as data processing resources like tenant containers and VM instances, data storage resources, networking resources, data communication resources, network services, VPN instances, and the like.

Each type of computing resource 604 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 604 not mentioned specifically herein.

The computing resources 604 provided by a cloud computing network may be enabled in one example by one or more data centers 600 (which might be referred to herein singularly as "a data center 600" or in the plural as "the data centers 600). The data centers 600 are facilities utilized to house and operate computer systems and associated components. The data centers 600 typically include redundant and backup power, communications, cooling, and security systems. The data centers 600 may also be located in geographically disparate locations. One illustrative example for a data center 600 that may be utilized to implement the technologies disclosed herein is described herein with regard to, for example, FIGS. 1 through 5.

Figure 7:
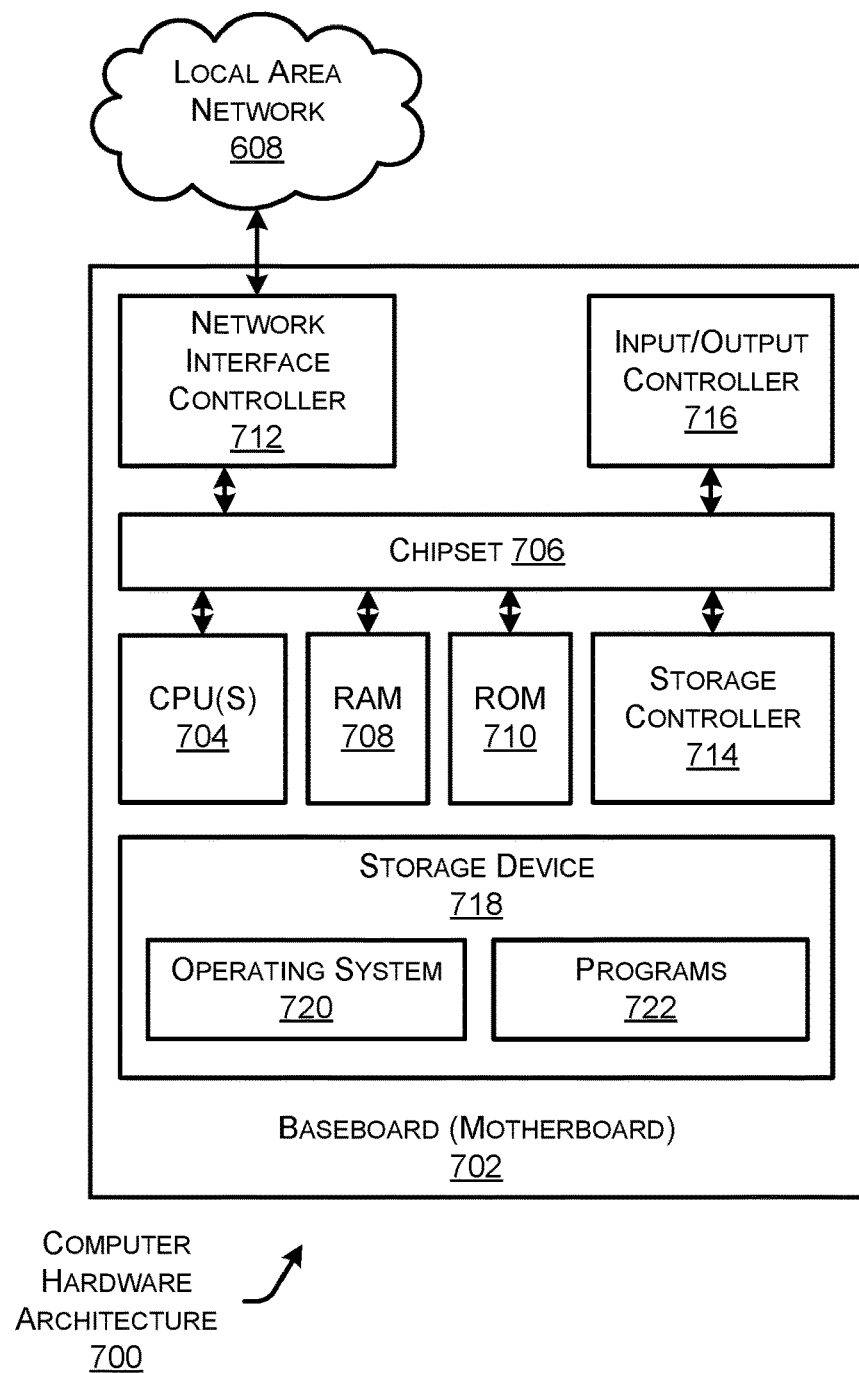
FIG. 7 illustrates a computer architecture diagram showing an example computer hardware architecture for implementing a computing device that may be utilized to implement aspects of the various technologies presented herein.

FIG. 7 illustrates a computer architecture diagram showing an example computer hardware architecture 700 for implementing a computing device that may be utilized to implement aspects of the various technologies presented herein. The computer hardware architecture 700 shown in FIG. 7 illustrates the network nodes 102, the PSN 104, the network 106, and/or other systems or devices associated with the network nodes 102 and/or remote from the network nodes 102, a workstation, a desktop computer, a laptop, a tablet, a network appliance, an e-reader, a smartphone, or other computing device, and may be utilized to execute any of the software components described herein. The computer 700 may, in some examples, correspond to a network device (e.g., network nodes 102 and/or the PSN 104) described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices may be connected by way of a system bus or other electrical communication paths. In one illustrative configuration, one or more central processing units (CPUs) 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the network 106, the network nodes 102, and the PSN 104, among other devices. The chipset 706 may include functionality for providing network connectivity through a Network Interface Controller (NIC) 712, such as a gigabit Ethernet adapter. The NIC 712 is capable of connecting the computer 700 to other computing devices within the network 106 and external to the network 106. It may be appreciated that multiple NICs 712 may be present in the computer 700, connecting the computer to other types of networks and remote computer systems. In some examples, the NIC 712 may be configured to perform at least some of the techniques described herein, such as packet redirects and/or other techniques described herein.

The computer 700 may be connected to a storage device 718 that provides non-volatile storage for the computer. The storage device 718 may store an operating system 720, programs 722 (e.g., any computer-readable and/or computer-executable code described herein), and data, which have been described in greater detail herein. The storage device 718 may be connected to the computer 700 through a storage controller 714 connected to the chipset 706. The storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the storage device 718 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 718 is characterized as primary or secondary storage, and the like.

For example, the computer 700 may store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the storage device 718 by detecting the physical states or characteristics of one or more particular locations within the physical storage units.

In addition to the storage device 718 described above, the computer 700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 700. In some examples, the operations performed by the network node 102, the PSN 104, the network 106, and/or any components included therein, may be supported by one or more devices similar to computer 700. Stated otherwise, some or all of the operations performed by the network node 102, the PSN 104, the network 106, and/or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 718 may store an operating system 720 utilized to control the operation of the computer 700. According to one example, the operating system 720 comprises the LINUX operating system. According to another example, the operating system comprises the WINDOWS® SERVER operating system from MICROSOFT Corporation of Redmond, Wash. According to further examples, the operating system may comprise the UNIX operating system or one of its variants. It may be appreciated that other operating systems may also be utilized. The storage device 718 may store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1 through 7. The computer 700 may also include computer-readable storage media having instructions stored thereupon for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

As described herein, the computer 700 may comprise one or more of the network nodes 102, the PSN 104, the network 106, and/or other systems or devices associated with the network nodes 102 and/or remote from the network nodes 102. The computer 700 may include one or more hardware processor(s) such as the CPUs 704 configured to execute one or more stored instructions. The CPUs 704 may comprise one or more cores. Further, the computer 700 may include one or more network interfaces configured to provide communications between the computer 700 and other devices, such as the communications described herein as being performed by the network node 102, the PSN 104, the network 106, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for the network node 102, the PSN 104, the network 106 as described herein. The programs 722 may enable the devices described herein to perform various operations.

Conclusion

The examples described herein provide systems and methods that prevent traffic loss by moving the DIS of an overlay LAN such that the new DIS is able to cover a set of network nodes. This is because overlay technologies based on IS-IS protocol do not have control plane redundancy in place. As a result, on certain underlay failures, the control plane partitions, leading to data plane traffic loss. Thus, the move of the DIS ensures that such traffic loss is eliminated in situations where one or more communication links between network nodes is lost.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method, comprising:
    establishing a communication pathway between a plurality of network nodes within a network, the plurality of network nodes having adjacencies with one another;
    executing a designated intermediate system (DIS) election operation to determine a first network node among the plurality of network nodes as the DIS for the network;
    creating a first pseudo node for the first network node, the first pseudo node including a first pseudo node link state packet (PSN-LSP);
    with each network node of the plurality of network nodes, determining whether the connectivity between the first network node and the other network nodes of the plurality of network nodes within the network is in a synchronous state with the adjacencies with the other network nodes of the plurality of network nodes within the network.

2. The method of claim 1, further comprising:
    monitoring connectivity between the first network node and other network nodes of the plurality of network nodes within the network; and
    monitoring adjacencies with the other network nodes of the plurality of network nodes within the network.

3. The method of claim 2, wherein monitoring the connectivity between the first network node and the other network nodes of the plurality of network nodes within the network is based on DIS intermediate system to intermediate system (IS-IS) hello packets, a pseudo node (PSN) link state packet (LSP), or combinations thereof.

4. The method of claim 1, further comprising:
    based at least in part on a determination that the connectivity between the first network node and the other network nodes of the plurality of network nodes within the network is in a non-synchronous state with the adjacencies with the other network nodes of the plurality of network nodes within the network:
        monitoring the non-synchronous state for a first period of time; and
        based at least in part on a determination that the non-synchronous state exists after the first period of time, executing a DIS priority change algorithm to change the DIS from the first network node to a second network node, the second network node creating a second pseudo node including a second PSN-LSP,
    wherein executing the DIS priority change algorithm comprises:
        identifying the second network node of the plurality of network nodes with a highest number of adjacencies; and
        assigning the second network node to be the DIS.

5. The method of claim 4, further comprising disqualifying the first network node and any other network node of the plurality of network nodes lacking connectivity with the first network node from being assigned as the DIS.

6. The method of claim 4, wherein assigning the second network node to be the DIS comprises assigning the second network node with a relatively higher DIS priority field than any other network node of the plurality of network nodes.

7. The method of claim 4, further comprising, based at least in part on a determination that two of the plurality of network nodes have a highest number of adjacencies:
    identifying the second network node of the plurality of network nodes with a highest system identification; and
    assigning the second network node to be the DIS based on the highest system identification.

8. The method of claim 4, further comprising, based at least in part on a determination that two of the plurality of network nodes have a highest number of adjacencies:
    identifying the second network node of the plurality of network nodes with an updated DIS priority change algorithm; and
    assigning the second network node to be the DIS based on the updated DIS priority change algorithm.

9. The method of claim 4, further comprising:
    determining every instance of a second period of time whether the connectivity between the first network node and the other network nodes of the plurality of network nodes within the network is in the synchronous state with the adjacencies of the first network node with the other network nodes of the plurality of network nodes within the network; and based at least in part on a determination that the connectivity between the first network node and the other network nodes of the plurality of network nodes within the network is in the synchronous state with the adjacencies of the first network node with the other network nodes of the plurality of network nodes within the network, executing the DIS priority change algorithm to change the DIS from the second network node to the first network node.

10. The method of claim 1, wherein executing the DIS election operation to determine the first network node among the plurality of network nodes as the DIS for the network comprises:
identifying the first network node of the plurality of network nodes with a highest system identification; and
assigning the first network node to be the DIS.

11. A network node comprising:
one or more processors; and
one or more non-transitory computer-readable media storing instructions that, when executed by the one or more processors, cause the one or more processors to perform operations comprising:
establishing a communication pathway between a plurality of network nodes within a network, the plurality of network nodes having adjacencies with one another;
executing a designated intermediate system (DIS) election operation to determine a first network node among the plurality of network nodes as the DIS for the network;
creating a first pseudo node for the first network node, the first pseudo node including a pseudo node link state packet (PSN-LSP);
with each network node of the plurality of network nodes determining whether the connectivity between the first network node and the other network nodes of the plurality of network nodes within the network is in a synchronous state with the adjacencies with the other network nodes of the plurality of network nodes within the network.

12. The network node of claim 11, the operations further comprising:
monitoring connectivity between the first network node and other network nodes of the plurality of network nodes within the network;
monitoring adjacencies with the other network nodes of the plurality of network nodes within the network;
based at least in part on a determination that the connectivity between the first network node and the other network nodes of the plurality of network nodes within the network is in a non-synchronous state with the adjacencies with the other network nodes of the plurality of network nodes within the network:
monitoring the non-synchronous state for a first period of time; and
based at least in part on a determination that the non-synchronous state exists after the first period of time, executing a DIS priority change algorithm to change the DIS from the first network node to a second network node, the second network node creating a second pseudo node including a second PSN-LSP.

13. The network node of claim 11, wherein the network is an overlay transport virtualization (OTV) LAN network in which the first network node executes an IS-IS protocol in a control plane.

14. The network node of claim 11, wherein executing the DIS priority change algorithm comprises assigning the second network node to be the DIS based at least in part on identifying the second network node of the plurality of network nodes with a highest number of adjacencies, identifying the second network node of the plurality of network nodes with a highest system identification, identifying the second network node of the plurality of network nodes with an updated DIS priority change algorithm, identifying the second network node of the plurality of network nodes with a relatively higher DIS priority field than any other network node of the plurality of network nodes, or combinations thereof.

15. The network node of claim 11, the operations further comprising disqualifying the first network node and any other network node of the plurality of network nodes that lack connectivity with the first network node from being assigned as the DIS.

16. The network node of claim 11, the operations further comprising:
determining every instance of a second period of time whether the connectivity between the first network node and the other network nodes of the plurality of network nodes within the network is in a synchronous state with the adjacencies of the first network node with the other network nodes of the plurality of network nodes within the network; and
based at least in part on a determination that the connectivity between the first network node and the other network nodes of the plurality of network nodes within the network is in the synchronous state with the adjacencies of the first network node with the other network nodes of the plurality of network nodes within the network, executing the DIS priority change algorithm to change the DIS from the second network node to the first network node.

17. A non-transitory computer-readable medium storing instructions that, when executed, causes a processor to perform operations, comprising:
establishing a communication pathway between a plurality of network nodes within a network, the plurality of network nodes having adjacencies with one another;
executing a designated intermediate system (DIS) election operation to determine a first network node among the plurality of network nodes as the DIS for the network;
creating a first pseudo node for the first network node, the first pseudo node including a pseudo node link state packet (PSN-LSP);
with each network node of the plurality of network nodes determining whether the connectivity between the first network node and the other network nodes of the plurality of network nodes within the network is in a synchronous state with the adjacencies with the other network nodes of the plurality of network nodes within the network.

18. The non-transitory computer-readable medium of claim 17, the operations further comprising,
monitoring connectivity between the first network node and other network nodes of the plurality of network nodes within the network;
monitoring adjacencies with the other network nodes of the plurality of network nodes within the network; and based at least in part on a determination that the connectivity between the first network node and the other network nodes of the plurality of network nodes within the network is in a non-synchronous state with the adjacencies with the other network nodes of the plurality of network nodes within the network:

monitoring the non-synchronous state for a first period of time; and based at least in part on a determination that the non-synchronous state exists after the first period of time, executing a DIS priority change algorithm to change the DIS from the first network node to a second network node, the second network node creating a second pseudo node including a second PSN-LSP.

19. The non-transitory computer-readable medium of claim 18, wherein executing the DIS priority change algorithm comprises:

identifying the second network node of the plurality of network nodes with a highest number of adjacencies, identifying the second network node of the plurality of network nodes with a highest system identification, identifying the second network node of the plurality of network nodes with an updated DIS priority change algorithm, identifying the second network node of the plurality of network nodes with a relatively higher DIS priority field than any other network node of the plurality of network nodes, or combinations thereof; and assigning the second network node to be the DIS.

20. The non-transitory computer-readable medium of claim 19, the operations further comprising:

determining every instance of a second period of time whether the connectivity between the first network node and the other network nodes of the plurality of network nodes within the network is in the synchronous state with the adjacencies of the first network node with the other network nodes of the plurality of network nodes within the network; and based at least in part on a determination that the connectivity between the first network node and the other network nodes of the plurality of network nodes within the network is in the synchronous state with the adjacencies of the first network node with the other network nodes of the plurality of network nodes within the network, executing the DIS priority change algorithm to change the DIS from the second network node to the first network node.

* * * * *